United States Patent [19]
Lamberet

[11] 3,854,415
[45] Dec. 17, 1974

[54] CONVEYING SYSTEM WITH WATER-WAY

[76] Inventor: Paul Lamberet, Vonnas-Ain, France

[22] Filed: Jan. 12, 1973

[21] Appl. No.: 322,975

[30] Foreign Application Priority Data
July 21, 1972 France .............. 72.26993

[52] U.S. Cl. ................. 104/173, 104/73
[51] Int. Cl. ....................... B61b 9/00
[58] Field of Search ............. 104/73, 173

[56] References Cited
UNITED STATES PATENTS

| | | | |
|---|---|---|---|
| 597,838 | 1/1898 | Castle | 104/73 |
| 1,448,306 | 3/1923 | Lezert | 104/73 |
| 3,053,199 | 9/1962 | Brox et al. | 104/173 ST |
| 3,692,119 | 9/1972 | Tucker | 104/173 ST |

FOREIGN PATENTS OR APPLICATIONS
353,571  7/1905  France ................ 104/63

Primary Examiner—Drayton E. Hoffman
Attorney, Agent, or Firm—Waters, Roditi, Schwartz & Nissen

[57] ABSTRACT

A conveying system which comprises essentially an endless water-way in which is located a plurality of floating carriages or vessels each attached at one point to at least one endless cable operates by means of guide pulleys of which at least one is power-driven, to cause each carriage or vessel to follow substantially the path of said water-way.

5 Claims, 2 Drawing Figures

PATENTED DEC 17 1974

3,854,415

CONVEYING SYSTEM WITH WATER-WAY

BACKGROUND OF THE INVENTION

1. Field of the Invention

This invention relates in general to transfer systems, conveyors and handling equipment, suitably for production lines or the like.

2. Description of the Prior Art

Many conveying or transfer systems are already known, which are especially suitable for manufacturing or production lines, which comprise carriage or trolleys rolling on a floor-supported or overhead track. As a rule, these systems are relatively complicated, notably on account of the many switch points to be provided for example when the equipment is intended for supplying parts or workpieces to a production line. In this case, the driving means are frequently designed in the form of separate sections, so that a perfect synchronization of all the stations constituting or disposed along the manufacturing line is hardly obtainable.

SUMMARY OF THE INVENTION

It is an object of the present invention to avoid these inconveniences by providing a transfer or conveyor system comprising essentially an endless water-way in which is located a plurality of floating carriages or vessels each attached at one point to at least one endless cable extending between pulleys at least one of which is driven, said pulleys causing said cable to follow substantially the path of said water-way.

This arrangement is advantageous notably in that changes of direction having a relatively short radius may be contemplated, irrespective of the length of the floating carriages or vessels employed, since their floating condition enables them to slide laterally without any inconveniences and without producing any appreciable frictional force.

Advantageously, the connecting point between adjacent floating carriages or vessels is the driving cable provided at a location lying substantially centrally of the lower or bottom surfaces of these carriages, in order to avoid the generation of any torque in the carriage considered and permit the free pivotal movements thereof when required.

Preferably, and in order properly to guide the carriage by means of the lateral wall of the water-way when required, the side walls of the carriages are provided with vertical-axis rollers adapted to roll along said lateral walls of said water-way.

According to another feature characterizing this invention, in the sections where the carriages, due to the loading of materials, articles or products, or to the exertion of pressure, undergo a vertical downward thrust, the button of the water-way comprises horizontal-axis rollers disposed across the longitudinal axis of said water-way so that each carriage travelling in said section can bear on these last-named rollers with minimum frictional contact.

A particularly interesting application of this conveyor system resides in its utilization as a transfer member in an arrangement for manufacturing isothermal panels of stratified materials, such as the materials described in copending U.S. Pat. application No. 248,538 filed on Apr. 28th 1972, by the same Applicant.

In this arrangement, the transfer means consist of a pair of parallel tracks on which tables are adapted to travel, the dimensions of these tables corresponding to those of the panels being manufactured, each table being mounted on a carriage, a transfer station being provided at either end of these tracks to permit the passage of a table from one track to another.

It is clear that substituting the arrangement of the present invention for the transfer means contemplated in said prior patent application permits dispensing with the transfer stations at the ends of the two parallel track sections and also with the coupling and release means usually associated with the carriage supporting the tables in relation to the driving members.

A clearer understanding of this invention will result from the following description with reference to the diagrammatic drawing attached hereto, which illustrates by way of example a typical form of this equipment as applied to a plant for manufacturing isothermal panels of stratified materials as described in the above-mentioned patent application.

DESCRIPTION OF THE PREFERRED EMBODIMENT

Figure 1:
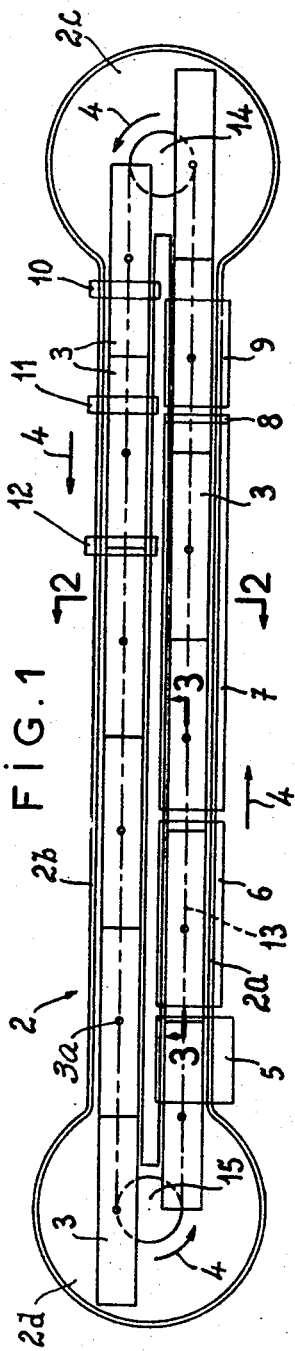
FIG. 1 is a plan view from above of the transfer conveyor.

The transfer conveyor arrangement of the invention comprises essentially a water-way 2 and a plurality of floating carriages or vessels 3 (twelve in the example illustrated herein).

The path or layout of the water-way 2 comprises two parallel rectilinear sections 2a and 2b disposed in accordance with the alignment of the various stations comprising the production line and interconnected at their ends by a pair of circular pools 2c and 2d. In this water-way the floating carriages 3 travel in the direction of the arrows 4. Section 2a of this water-way 2 constitutes the first section of the transfer conveyor system, that is, the section along which the floating carriages 3 travel in succession past a station 5 whereat the carriages each receive a sheet of stratified material or the like, a station 6 whereat an insulated panel of expanded material is laid, a tubular oven 7 equipped with a roller press, a station 8 whereat the panels are stripped continuously, and finally a station 9 whereat the stripped panels are machined also continuously.

The other or return section 2b of water-way 2 comprises in succession a station 10 in which the carriages 3 are washed, a station 11 for a laying of a stripping agent, and finally a station 12 adapted to deposit a gel-coat on each carriage 3.

The pools 2c and 2d are used for transferring the carriages or vessels 3 from one section to another along the water-way 2.

To permit the driving of the floating carriages 3 along the water-way 2 in the direction of the arrows 4, each carriage 3 is secured at the center 3a of its bottom face to at least one endless cable 13 (two such cables being provided in the example illustrated) connected between two pulleys 14 and 15 each having a vertical axis coincident with the center of one of the two end pools 2a and 2d, at least one of these pulleys being driven from means not shown in the drawing.

With this arrangement, each floating carriage 3 is pivoted through 180° at either end of sections 2a and 2b without resorting to any clutch means or transfer sections or other accessory elements, whereby the speed of said floating carriages 3 along section 2a is exactly the same as along section 2b.

Figure 2:
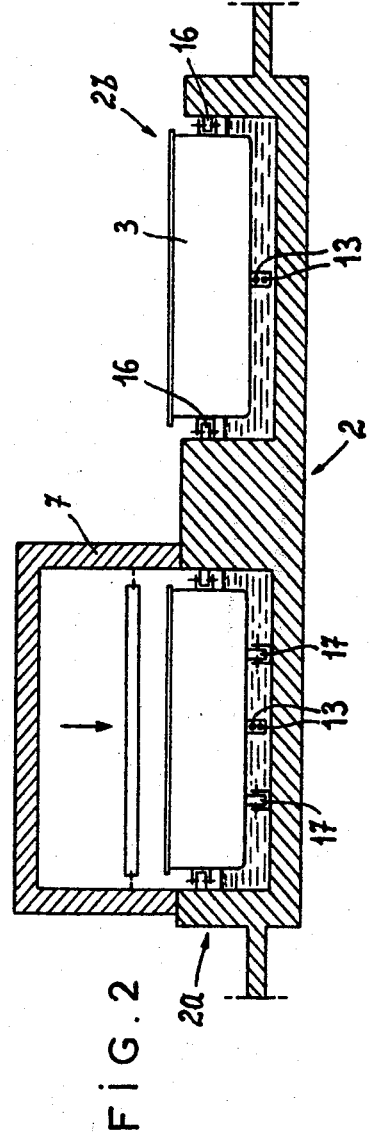
FIG. 2 is a cross section taken on enlarged scale along line 2—2 of FIG. 1.

As illustrated notably in FIG. 2, according to another feature characterizing this invention, each floating carriage 3 carries lateral guide rollers 16 having vertical axes and adapted to engage the vertical lateral walls of the water-way 2 for properly guiding said carriages 3.

In the portion of this water-way 2 where the carriages 2 are exposed to vertical downward efforts, as during their travel through the tubular oven 7 in which a roller press is provided, the water-way 2 comprises at its bottom a set of rollers 17 having horizontal axes extending transversely to the longitudinal axis of the corresponding water-way section, these rollers 17 being adapted to support the bottom of the floating carriages 3 when these, as a consequence of the vertical downward pressure exerted thereon, approach the bottom of said water-way.

It should be noted that if it is required to modify the level of a floating carriage during its travel along one of the stations of the production line, this can be done by the addition or withdrawal of ballast.

As clearly apparent from the drawing, in this arrangement comprising only two rectilinear sections 2a and 2b, and two sets of pulleys 14 and 15 for guiding the cables 13, the diameter of these pulleys 14, 15 corresponds to the distance between the longitudinal center lines of sections 2a and 2b of water-way 2.

Moreover, the diameter of the end pools 2c and 2d is calculated as a function of the length of the floating carriages 3 to permit the pivotal movements thereof at the ends of each rectilinear section 2a, 2b.

Figure 3:
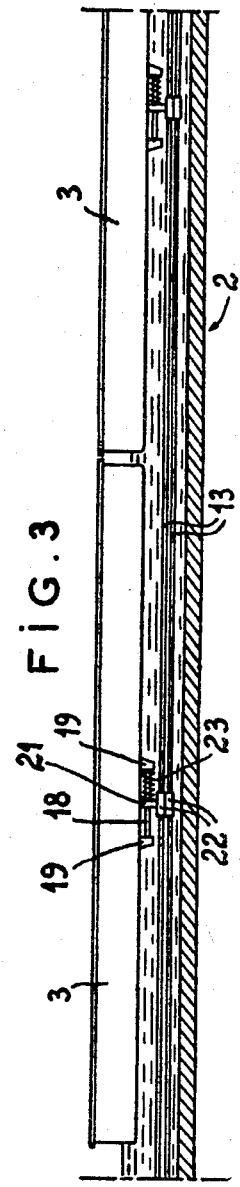
FIG. 3 is a fragmentary sectional view on enlarged scale showing the means provided for interconnecting the floating carriages and the driving cable thereof, the section being taken along line 3—3 of FIG. 1.

As shown in FIG. 3, the carriages 3 are coupled to the driving cables 13 through resilient devices capable of absorbing the expansion and contraction of these cables 13. To this end, each carriage 3 comprises centrally of its bottom face a horizontal rod 18 carried by a pair of brackets 19 so that the longitudinal axis of this rod lies in the vertical plane containing the longitudinal center line of the carriage 3 involved. A slide 21, slidably mounted on rod 18 carries a pair of sleeves 22 each crimped on or welded to one of the twin cables 13, and a coil compression spring 23 surrounding the rod 18 is adapted to be compressed between one face of slide 21 and the corresponding bracket 19 supporting said rod.

Of course, this invention should not be construed as being strictly limited by the specific form of embodiment shown and illustrated herein, since various modifications may be brought thereto without departing from the basic principle of the invention as set forth in the appended claims.

What I claim as new is:

1. A conveying system for a production line, said system comprising means defining an endless water-way and including bottom and lateral inner walls, a plurality of floating carriages in said water-way, pulleys spaced along said water-way, a cable passing over said pulleys and along said water-way, and connecting means for attaching said carriages to said cable whereby the carriages are caused during operation of the conveying system to follow along said water-way, said carriages having bottom outer surfaces, said means for attaching said carriages pivotally to said cable being positioned substantially centrally on the bottom outer surfaces to avoid generation of pivotal torque during the operation of the conveying system and whereby said carriage can pivot freely as required, said carriages having side outer walls and including thereon rollers having vertical axes, said rollers being adapted to engage the lateral inner walls of said water-way for the guiding of said carriages; said connecting means including resilient means for accommodating expansion and contraction of said cable, said water-way including at least one rectilinear section and the carriages being connected to the cable such as to be in substantially abutting relation in said rectilinear section.

2. A conveying system as claimed in claim 1 comprising means along said water-way by which the carriages travelling therealong receive a vertical downward thrust, and rollers on the bottom wall of the water-way having horizontal axes disposed transversely of said water-way at the latter said means whereby the carriages can bear against the latter said rollers.

3. A conveying system as claimed in claim 1 wherein said resilient means is arranged to operate in parallel with said cable.

4. A conveying system as claimed in claim 1 comprising stations arranged along said water-way for the building of isothermal panels on the carriages.

5. A conveying system as claimed in claim 1 wherein said water-way includes parallel rectilinear sections and circular sections connecting the rectilinear sections at the ends of the latter, the circular sections being so dimensioned and arranged as to accommodate movement of the carriages between the rectilinear sections.

* * * * *